US012760821B2

(12) United States Patent
Gammon

(10) Patent No.: US 12,760,821 B2
(45) Date of Patent: Oct. 13, 2026

(54) HOSE ROTATOR

(71) Applicant: GAMMON TECHNICAL PRODUCTS, INC., Manasquan, NJ (US)

(72) Inventor: James H. Gammon, Manasquan, NJ (US)

(73) Assignee: GAMMON TECHNICAL PRODUCTS, INC., Manasquan, NJ (US)

( * ) Notice: Subject to any disclaimer, the term of this patent is extended or adjusted under 35 U.S.C. 154(b) by 23 days.

(21) Appl. No.: 19/172,819

(22) Filed: Apr. 8, 2025

(65) Prior Publication Data

US 2025/0320941 A1 Oct. 16, 2025

Related U.S. Application Data

(60) Provisional application No. 63/633,258, filed on Apr. 12, 2024.

(51) Int. Cl.
*F16L 15/08* (2006.01)
*F16L 27/08* (2006.01)

(52) U.S. Cl.
CPC ........... *F16L 27/0824* (2013.01); *F16L 15/08* (2013.01)

(58) Field of Classification Search
CPC .............. F16L 27/0824; F16L 27/0828; B65H 75/4478
See application file for complete search history.

(56) References Cited

U.S. PATENT DOCUMENTS

| | | | | |
|---|---|---|---|---|
| 794,499 A * | 7/1905 | Hageman | F16L 27/0828 | 285/98 |
| 2,414,997 A * | 1/1947 | Atkins | F16L 27/0824 | 285/91 |
| 2,501,639 A * | 3/1950 | Warren | F16L 27/0861 | 285/305 |
| 2,587,938 A * | 3/1952 | Warren | B05B 15/652 | 285/317 |
| 4,111,465 A * | 9/1978 | Knight | F16L 27/0861 | 285/147.2 |
| 4,757,838 A | 7/1988 | McGullion | | |
| 5,518,023 A | 5/1996 | Garcia | | |
| 5,538,296 A * | 7/1996 | Horton | F16L 27/0824 | 285/276 |
| 6,742,740 B2 | 6/2004 | Tisbo et al. | | |
| 10,752,465 B2 | 8/2020 | Prince | | |
| 2013/0118607 A1* | 5/2013 | Eley | F16L 27/0828 | 285/275 |
| 2022/0166203 A1 | 5/2022 | Theiss | | |

FOREIGN PATENT DOCUMENTS

| | | | |
|---|---|---|---|
| DE | 202021106647 U1 * | 1/2022 | F16L 27/0841 |
| FR | 2470324 A1 * | 5/1981 | F16J 15/164 |
| WO | 2002061323 A1 | 8/2002 | |

* cited by examiner

*Primary Examiner* — Matthew Troutman
*Assistant Examiner* — James A Linford
(74) *Attorney, Agent, or Firm* — Shumaker, Loop & Kendrick, LLP; James D. Miller

(57) ABSTRACT

A hose rotator includes a first coupling component and a second coupling component received in the first coupling component. The first coupling component is selectively rotatable with respect to the second coupling component. A release system is selectively disengaging a stationary rotational position of the first coupling component with respect to the second coupling component.

16 Claims, 9 Drawing Sheets

HOSE ROTATOR

CROSS REFERENCE TO RELATED APPLICATIONS

This application claims the benefit of U.S. Provisional Application No. 63/633,258 filed on Apr. 12, 2024. The entire disclosure of the above application is hereby incorporated herein by reference.

FIELD OF THE INVENTION

The present invention relates to a hose reel and more particularly to a hose rotator or indexer for coupling a hose to the hose reel.

BACKGROUND OF THE INVENTION

As known, a hose reel is utilized to ergonomically store and dispense a hose configured for supplying a fluid. The hose reel permits the hose to be selectively wound and unwound as desired and provides safety and space saving features for storing the hose. The hose can be configured for conveying any fluid such as fuel, water, gas, or any other fluid as desired.

Typically, hose reels have an inlet for receiving fluid from a fluid source and an outlet for connecting to the hose to convey the fluid from the hose reel to the hose. A swivel connect is generally employed at the inlet to permit the hose, or other coupling, to rotate with respect to the reel. However, the hose does not rotate at the outlet. In certain reels, the outlet is configured as a goose-neck type coupling. When the hose is installed onto the hose reel, the hose is oriented, rotationally about an axial direction, at a stagnant set point.

As a result, because the hose is rotationally stagnant at the outlet, the hose begins to wear on certain portions thereof, particularly on the portion of the hose that drags on the ground. Additionally, the positioning of the outlet, especially with respect to a height of the hose reel, is intentional as the position of the outlet permits a hose connection resulting in maximum flow and minimizes kinking and damage to the hose.

It is optimally desired to permit a simple rotation of the hose, periodically, to minimize wear on the hose without compromising the set positioning of the hose connecting on the hose reel and without having to disconnect the hose from the fluid outlet. It is also desired for a device that permits the hose to periodically rotate while minimizing kinking and restriction of fluid flow through the hose.

SUMMARY OF THE INVENTION

Consistent and consonant with the present invention, a hose rotator permitting periodic rotation of a hose with respect to a hose reel while maintaining efficient fluid flow and minimizing cost and complexity has surprisingly been discovered.

According to an embodiment of the disclosure, a hose rotator includes a first coupling component and a second coupling component received in the first coupling component. The first coupling component is selectively rotatable with respect to the second coupling component. A release system is selectively disengaging a stationary rotational position of the first coupling component with respect to the second coupling component.

According to another embodiment of the disclosure, a hose rotator coupling a hose to a fluid outlet is disclosed. The hose rotator includes a first coupling component configured to receive an end of a hose. The first coupling component has an annular extension. A second coupling component receives the annular extension of the first coupling component. The second coupling component is configured to be received in a fluid outlet. The first coupling component is rotationally stationary with respect to the second coupling component in each of a plurality of locked positions and rotationally movable with respect to the second coupling component in a freely rotatable position intermediate adjacent ones of the plurality of locked positions. A release system has a button cooperating with the first coupling component and the second coupling component to permit the second coupling component to rotate to the freely rotatable position.

BRIEF DESCRIPTION OF THE DRAWINGS

The above advantages of the invention will become readily apparent to those skilled in the art from reading the following detailed description of an embodiment of the invention in the light of the accompanying drawings, in which.

DETAILED DESCRIPTION OF THE PREFERRED EMBODIMENT

Figure 1:
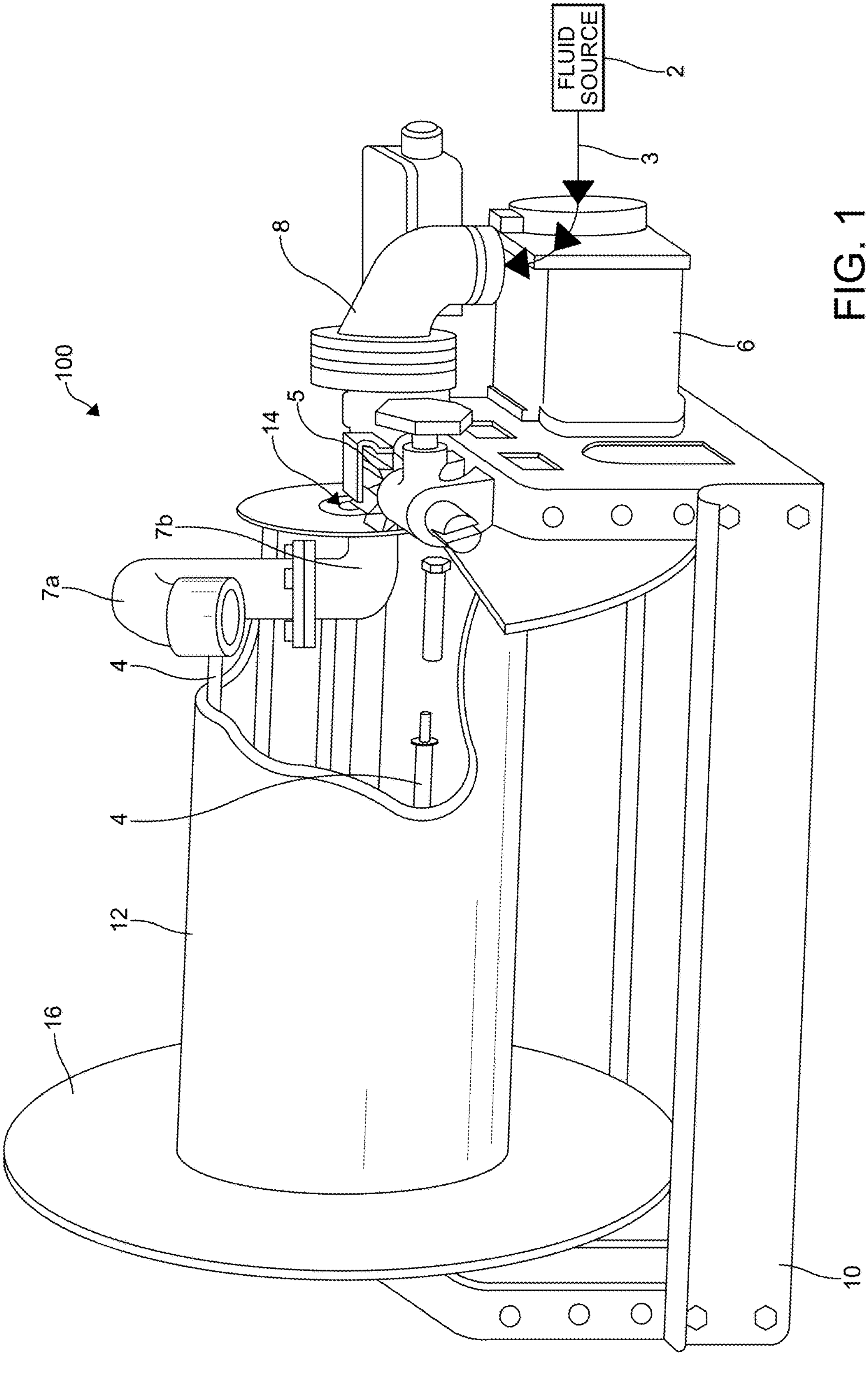
FIG. 1 is a front perspective view of a hose reel according to an embodiment of the disclosure, with portions thereof removed for illustrative purposes.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of" Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

This disclosure relates to hose reels and hoses such as industrial type hose reels for supplying and conveying fluid such as fuel for fuel handling system. For example, the hose reels and hoses may be employed to supply fuel for aviation systems. However, it is understood, the disclosure can relate to any hose reel and hose systems used to convey any fluid such as any fuel, water, gas, or any other fluid that hoses are employed to convey.

For illustration purposes, a hose reel 100 configured for efficiently storing and dispensing a dispensing hose (not shown) is shown. The hose reel 100 includes a frame 10 for receiving a cylindrical drum 12. The drum 12 is rotatably coupled to the frame 10 by a rotation permitting apparatus 14 (generally indicated), such as a bearing housing for example, disposed at opposing ends of the drum 12. The drum 12 includes a pair of discs 16 (only one is shown) disposed at each of opposing ends of the drum 12 to maintain and guide the hose on the drum 12. Tie rods 4 join the discs 16 and the drum 12. A motor 6 and drive mechanisms 5 are in mechanical communication with the drum 12 to provide rotation to the drum 12. Although, it is understood any driving mechanism can be employed. Also, a manual forced rotation can also be applied to the drum 12 to rotate the drum 12. A fluid source conduit 3 (indicated by the line with arrows), such as a hose, for example, connects a fluid source 2 to an inlet 8 of the hose reel 100. The inlet 8 is configured as a swivel joint inlet 8 to permit the fluid source conduit 3 to rotate freely with respect to the hose reel 100 while remaining rigidly connected to the fluid source 2. It is understood the inlet 8 can be any type of inlet or rigid or non-rigid joint as desired without departing from the scope of the disclosure. A fluid hub **7*b* provides fluid communication between the inlet 8 and a fluid outlet 7*a*. The fluid outlet 7***a* is configured for connecting to an inlet end of a hose (not shown). The fluid outlet 7*a* is configured as a gooseneck type fitting to facilitate desired flow rates and to ensure the inlet end of the hose remains off the ground or other surface.

Figure 2:
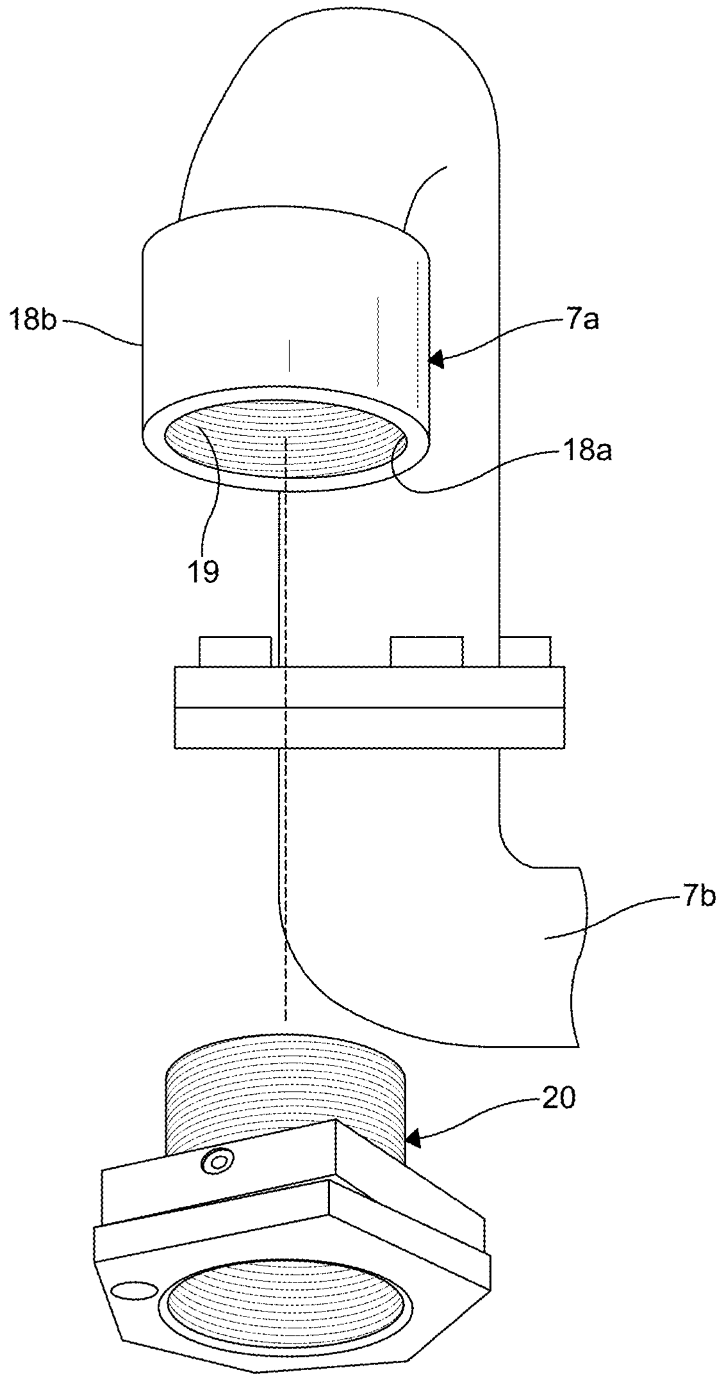
FIG. 2 is a fragmentary partially exploded front perspective view of a hose rotator configured for coupling to a conduit connector of the hose reel of FIG. 1.
Figure 3:
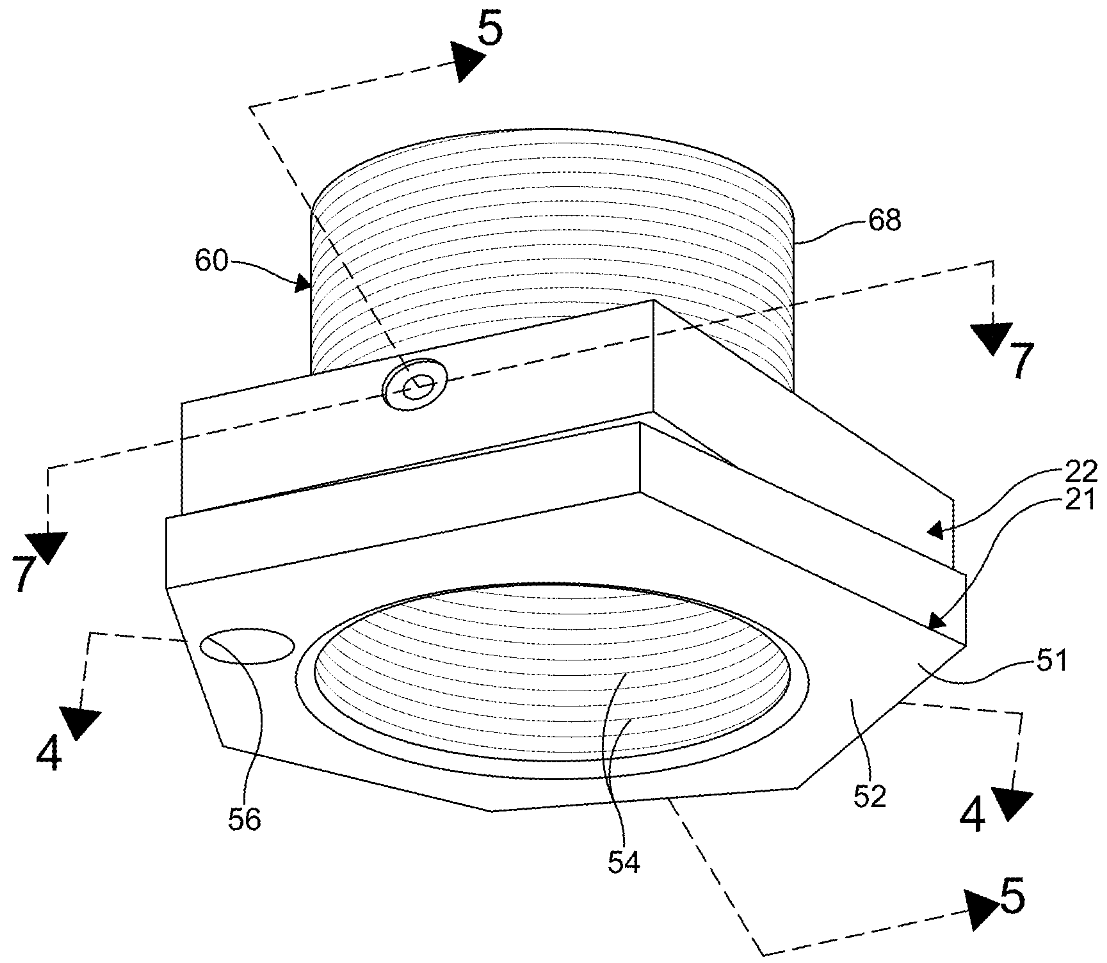
FIG. 3 is an front perspective view of the hose rotator of FIG. 2.
Figure 4:
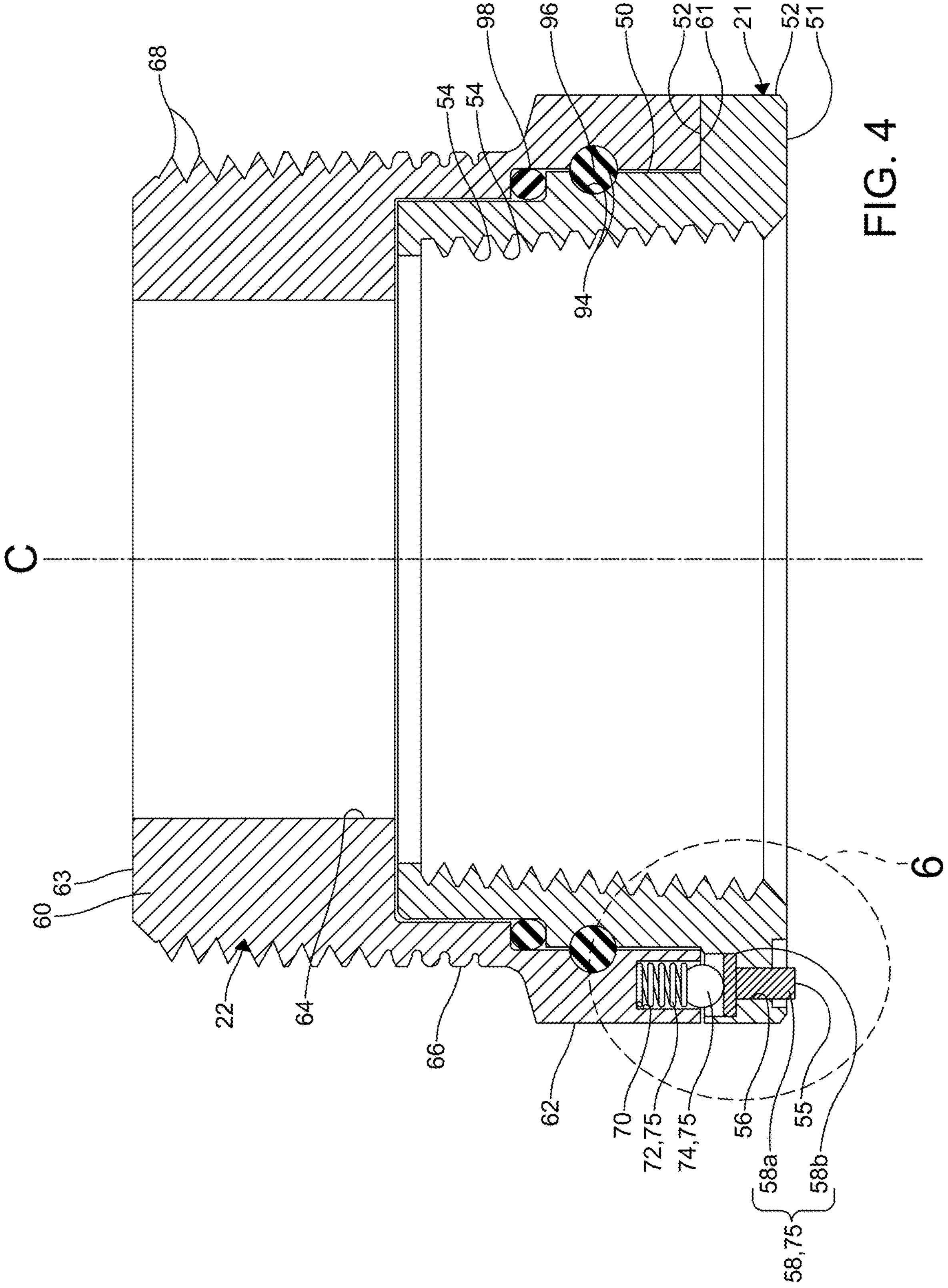
FIG. 4 is an elevational cross-sectional view of the hose rotator of FIG. 3, taken lengthwise through cross-sectional line 4-4.
Figure 5:
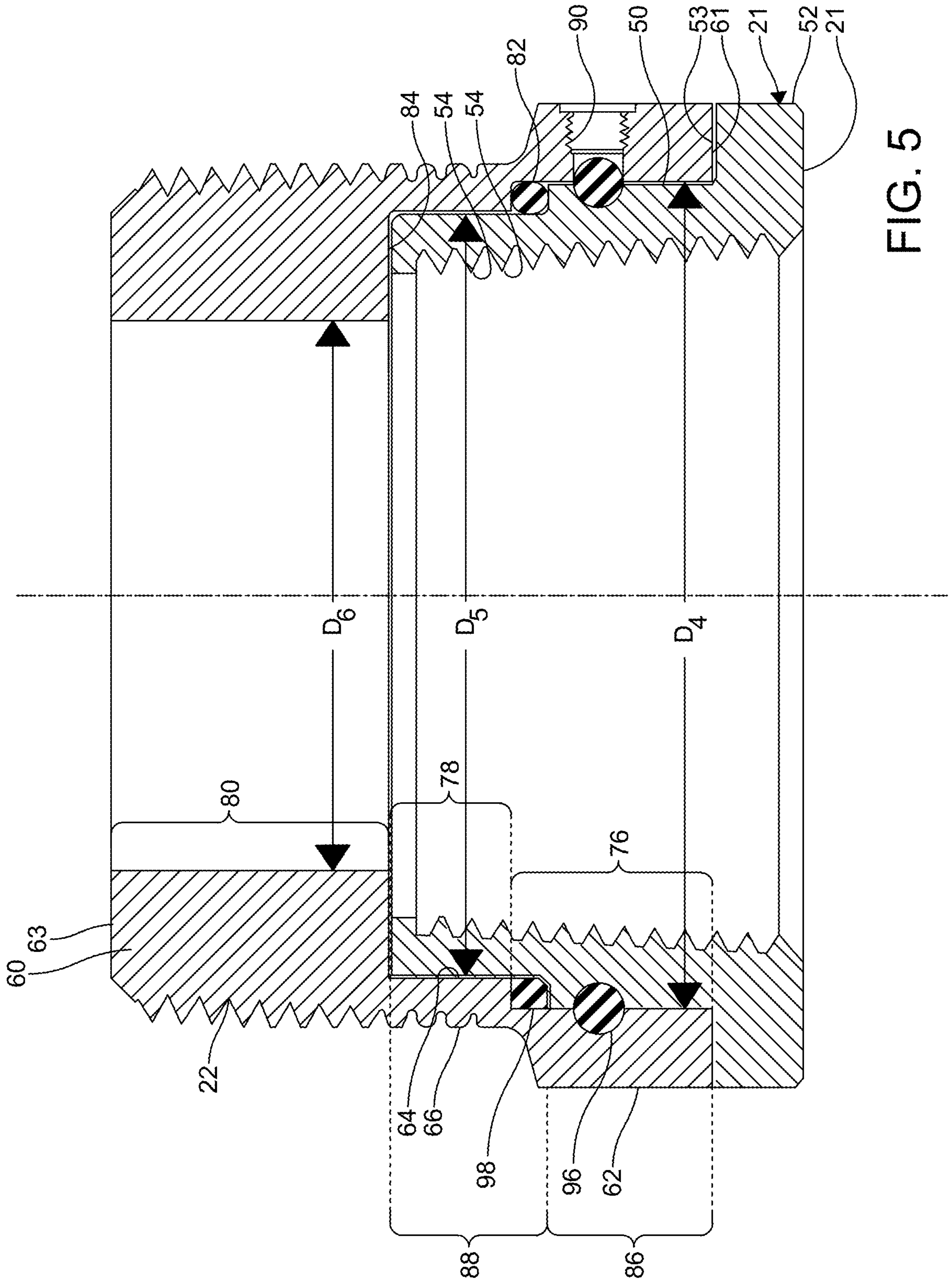
FIG. 5 is an elevational cross-sectional view of the hose rotator of FIG. 3, taken lengthwise through cross-sectional line 5-5.
Figure 6:
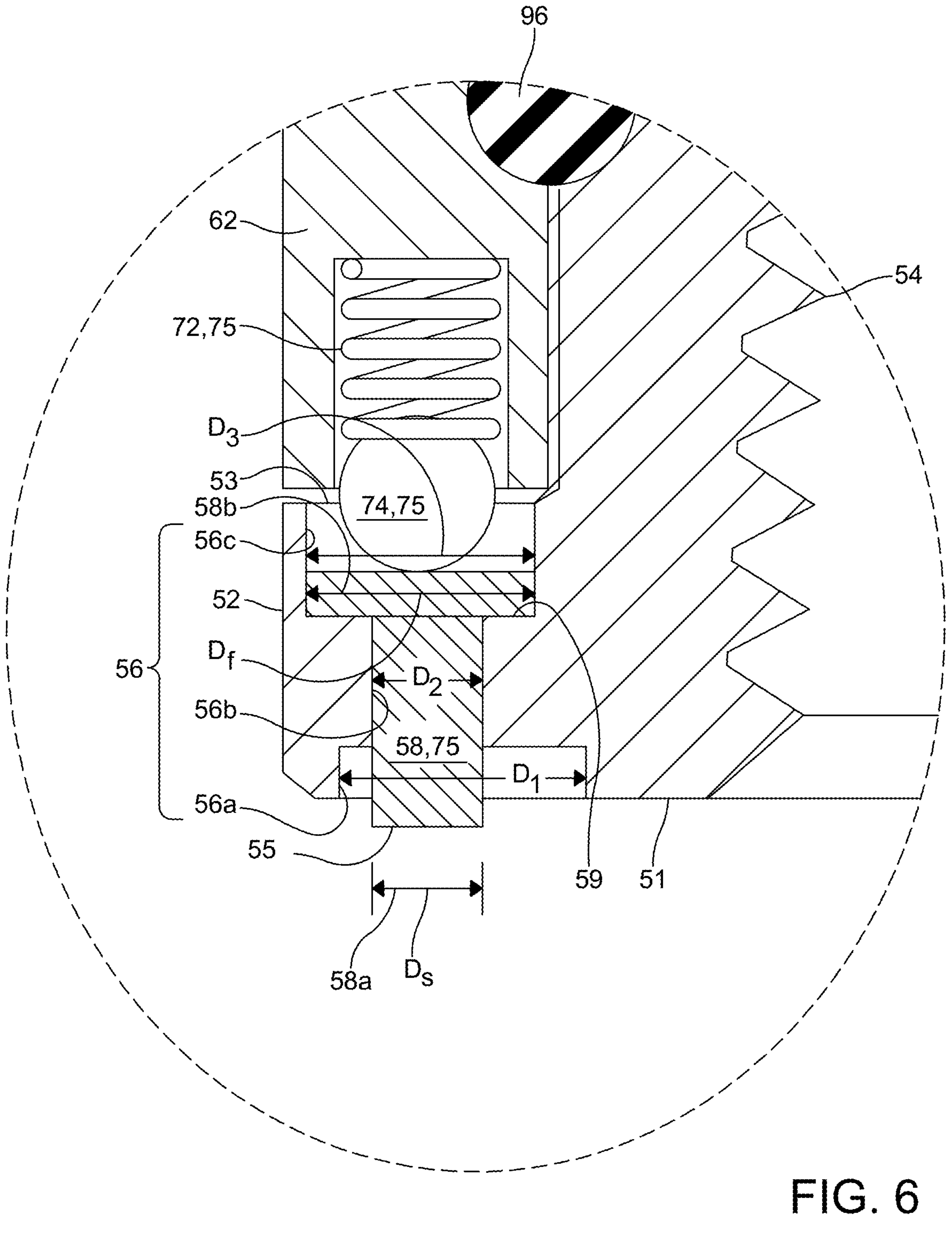
FIG. 6 is an enlarged fragmentary elevational view of the hose rotator of FIG. 4, highlighted by circle 6.
Figure 7:
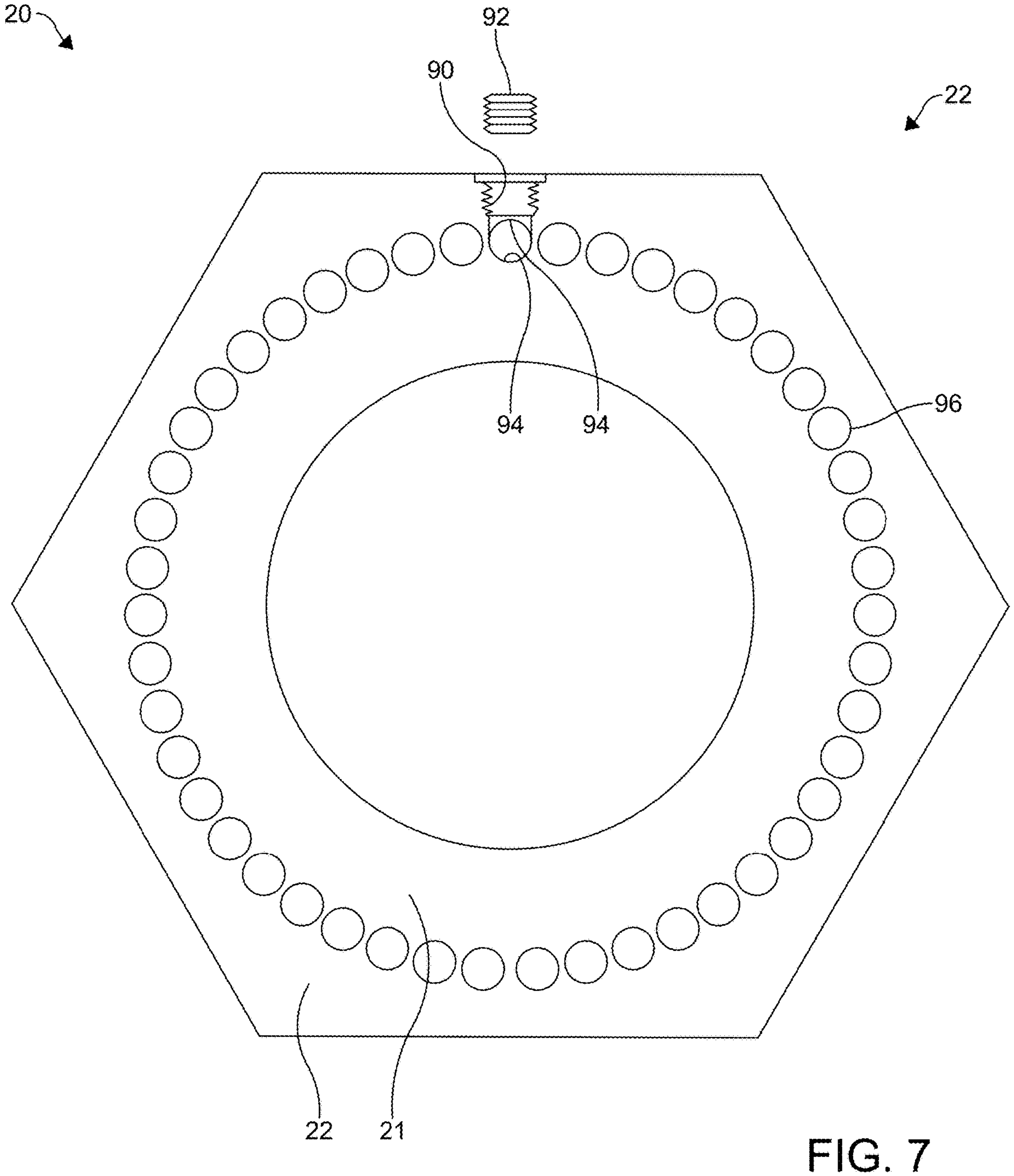
FIG. 7 is a cross-sectional top plan view of the hose rotator of FIGS. 3, taken through cross-sectional line 7-7.
Figure 8:
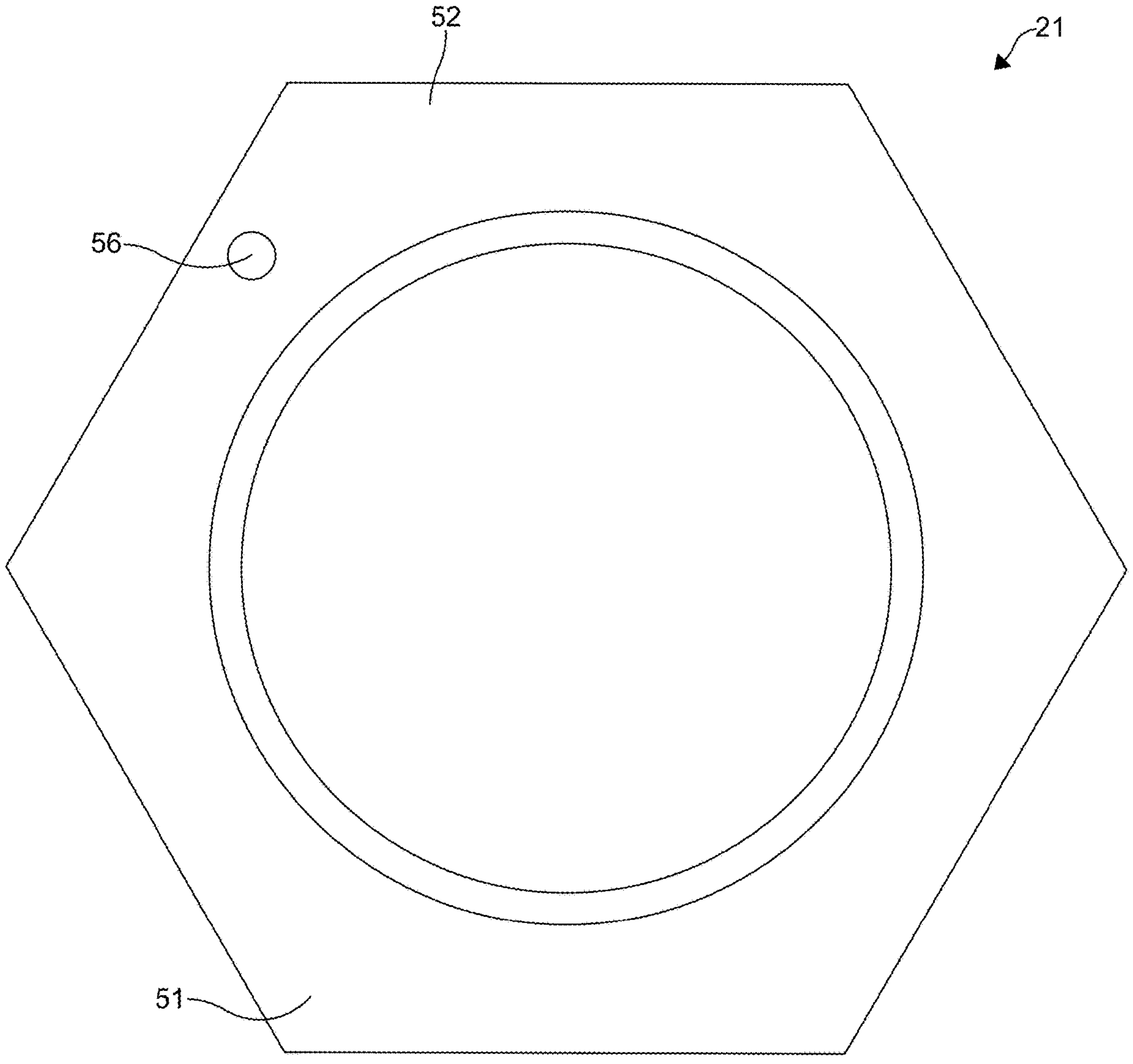
FIG. 8 is a bottom plan view a first coupling component of the hose rotator of FIG. 3.
Figure 9:
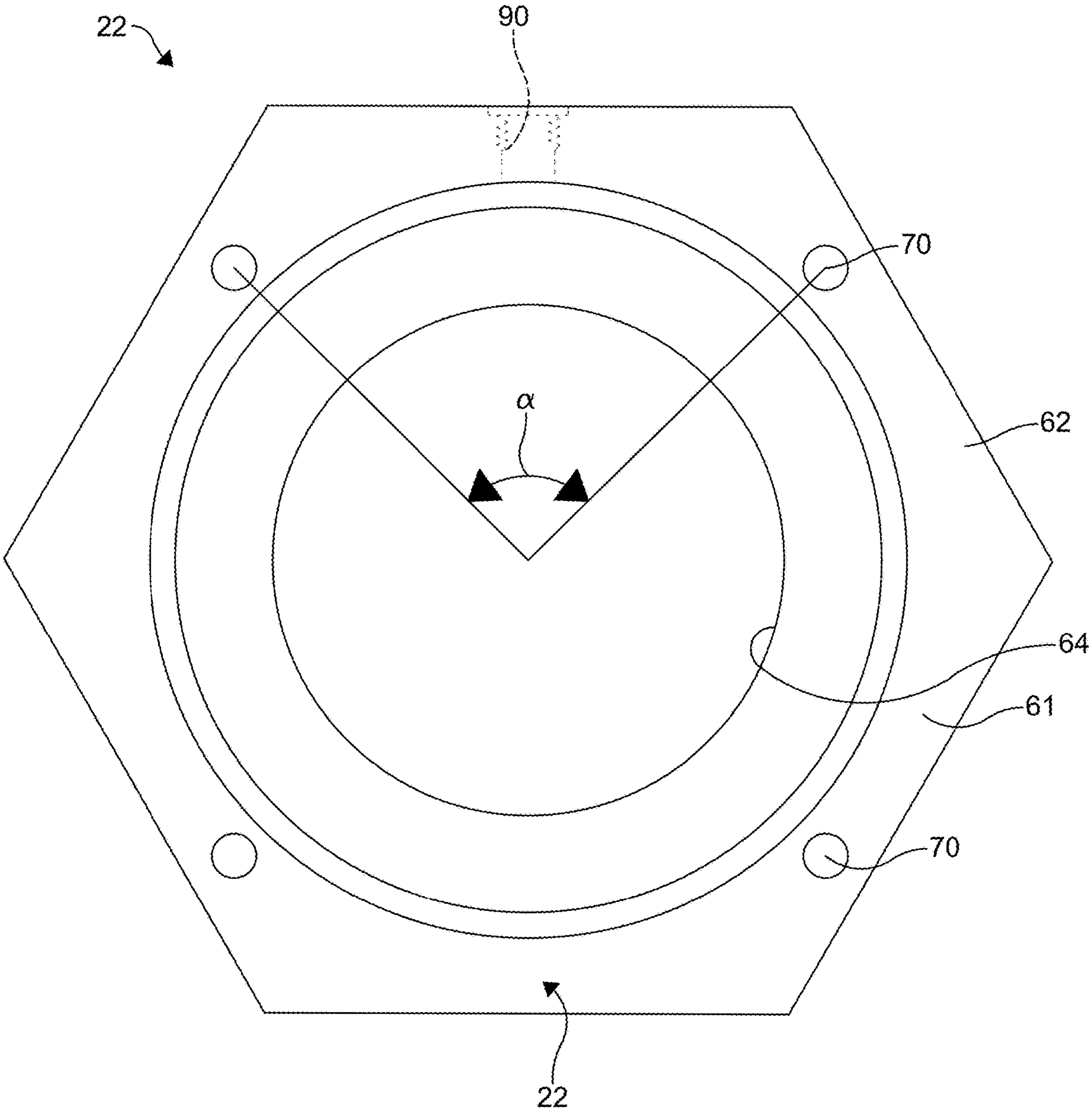
FIG. 9 is a bottom plan view of a second coupling component of the hose rotator of FIG. 3.

FIG. 2 illustrates a hose rotator 20 configured for coupling to the fluid outlet 7*a* of the hose reel 100. The fluid outlet 7*a* is substantially cylindrical having an inner surface 18*a* and an outer surface 18*b*. However, it is understood the fluid outlet 7*a* can have other shapes such as having an ovular cross-sectional shape, a rectangular cross-sectional shape, or any shape as desired. A threaded portion 19 is formed on the inner surface 18*a* of the fluid outlet 7*a* directly adjacent the end of the fluid outlet 7*a*. The threaded portion 19 is configured to receive and engage with an outer threaded portion 68 of the hose rotator 20 which will be described in further detail hereinbelow.

As shown in FIGS. 3-9, the hose rotator 20 includes a first coupling component 21 selectively rotatably coupled to and received in a second coupling component 22. The first coupling component 21 includes an annular extension 50 extending outwardly from a flange 52. The extension 50 includes an inner threaded portion 54 formed on an inner surface thereof. The inner threaded portion 54 is configured for engaging external threads formed on the desired dispensing hose (not shown). In another embodiment, the inner surface of the annular extension 50 can be non-threaded to receive a non-threaded end of another type of a dispensing hose, wherein a interference fit or alternate coupling device is employed to couple the dispensing hose to the first coupling component 21. The flange 52 has a substantially hexagonal cross-sectional shape to facilitate rotation of the first coupling component 21 with respect to the second coupling component 22. Although it is understood, the flange 52 can have other cross-sectional shapes as desired.

A single bore 56 is formed through the flange 52 to receive a rivet 58 therethrough. The bore 56 has a first inner surface 56*a*, a second inner surface 56*b*, and a third inner surface 56*c*. The first inner surface 56*a*, having a first inner diameter $D_1$, extends from an outer end surface 51 of the flange 52 in an axial direction towards the extension 50. The second inner surface 56*b*, having a second inner diameter $D_2$, extends intermediate the first inner surface 56*a* and the third inner surface 56*c*. The third inner surface 56*c*, having a third inner diameter $D_3$, extends from the second inner surface 56*b* of the bore 56 to an inner end surface 53 of the flange 52 opposing the first end surface 51 of the flange 52 adjacent the extension 50. The first inner diameter $D_1$ and the third inner diameter $D_2$ are greater than the second inner diameter $D_2$.

A rivet 58 is received in the bore 56. The rivet 58 includes a stem 58*a* with a diameter $D_s$ and a flange 58*b* with a diameter $D_f$ greater than the diameter $D_s$ of the stem 58 and greater than the diameter $D_2$ of the second inner surface 56*b*. The rivet 58 is received in the bore 56 in a direction from the inner end surface 53 of the flange 52 of the first coupling component 21 to the outer end surface 51 of the flange 52 of the first coupling component 21. As such, the first inner surface 56*a* and the second inner surface 56*b* of the bore 56 receives the stem 58*a* and the third inner surface 56*c* receives the flange 58*b* of the rivet 58, wherein the flange 58*b* of the rivet 58 does not extend beyond the third inner surface 56*c* of the bore 56 into the second inner surface 56*b* of the bore 56.

The diameter $D_f$ of the flange 58*b* of the rivet 58 is substantially equal to or less than the diameter $D_3$ of the third inner surface 56*c* but greater than the diameter $D_2$ of the second inner surface 56*b*. As a result, the flange 58*b* of the rivet 58 engages a shoulder 59 formed at an interface of the second inner surface 56*b* and the third inner surface 56*c* to militate against the flange 58*b* extending beyond the third inner surface 56*c*. When the flange 58*b* of the rivet 58 engages the shoulder 59, the stem 58*a* extends at a distance outwardly from the outer end surface 51 of the flange 52 of the first coupling component 21. As a result, the extension of the stem 58*a* outwardly from the outer end surface 51 of the flange 52 is configured as a button 55, wherein a user can apply pressure to the button 55 to activate a release system 75, which will be further discussed hereinbelow. The rivet 58 translates in an axial direction with respect to the bore between a first position wherein the stem 58*a* is configured as the button 51 and a second position wherein the flange 58*b* of rivet 58 aligns with the inner end surface and the stem 58*a* is received in the portion of the bore 56 at the third inner surface of the bore 56.

The second coupling component 22 includes a flange 62, an annular extension 60 extending outwardly from the flange 62, an inner surface 64, and an outer surface 66. The second coupling component 22 includes a planar first end surface 61 and a second end surface 63 axially opposing the first end surface 61. The flange 62 of the second portion 22 has a substantially hexagonal cross-sectional shape to facilitate rotation of the second coupling component 22 with respect to the first coupling component 21. The outer surface 66 of the annular extension 60 includes an outer threaded portion 68. The outer threaded portion 68 is configured to engage the inner threaded portion 19 formed on the inner surface 18*a* of the fluid outlet 7*a* of the hose reel 100.

A plurality of apertures 70 are formed in the first end surface 61 of the flange 62 of the second coupling component 22. As shown, there are four of the apertures 70 disposed at an angle α of about 90 degrees from each other about the flange 62. However, it is understood any number of apertures can be formed in the flange 62 and disposed at any angle at equal or unequal intervals as desired without departing from the scope of the disclosure. For example, the angle α can be 30 degrees, 45 degrees, 60 degrees, 180 degrees or any other angle as desired. The number of the apertures 70 can be 12, 8, 6, 4, or any number as desired. Each of the apertures 70 are disposed at about equal radial distances with each other from an axial center C of the hose rotator 20. The radial distance of each of the apertures 70 from the axial center C of the hose rotator 20 is about equal to the radial distance of the bore 56 of the first coupling component 21 from the axial center C of the hose rotator 20. As a result, depending on the rotational position of the first coupling component 21 with respect to the second coupling component 22, each of the apertures 70 can selectively align with the bore 56 upon a relative rotation of the first coupling component 21 with respect to the second coupling component 22.

Each of the apertures 70 receive a biasing member 72 and a ball 74. The biasing member 72 is configured as a spring. However, the biasing member 72 can be any type of device or component that is configured to apply a constant force or pressure to another part and to exert a pre-set position or tension. The biasing member 72 of the present disclosure engages the ball 74 and biases in a direction towards the ball 74 and an opening end of the aperture 70.

The rivet 58, the biasing member 72, and the ball 74 cooperate together to form the release system 75 when the bore 56 of the first coupling component 21 rotates and aligns with one of the apertures 70 of the second coupling component 23. When the bore 56 aligns with one of the apertures 70, herein designated as the locked position of the hose rotator 20, the biasing member 72 biases the ball 74 towards the bore 56 so that the ball 74 at least partially extends into the bore 56. The ball 74 extends partially into the bore 56 causing rotational resistance between the first coupling component 21 and the second coupling component 22. As a result of the extension of the ball 74 into the bore 56, the ball 72 then engages the rivet 58 and transfers a spring force from the biasing member 72 to the rivet 58 in the first position to cause the rivet 58 to linearly translate to the second position to essentially “lock” the hose rotator 20 to militate from any relational rotation between the first coupling component 21 and the second coupling component 23.

The first coupling component 21 is configured to rotate between a locked position, wherein, in the locked position, one of the apertures 70 aligns with the bore 56 and the rivet 58 of associated with the aperture 70 is in the second position as described hereinabove. If there are four apertures, then the first coupling component 21 rotates between four locked positions. When the hose rotator 20 is not in one of the locked positions, the hose rotator 20 is in a freely rotatable position. When the hose rotator 20 is in the freely rotatable position, a force is applied to the rivet 58 which then transfers the force to the ball 74 and to the biasing member 72 of an aligned one of the apertures 70. The ball 74 is forced completely within the respective one of the apertures 70 directly between and engaging the respective biasing member 71 and the inner end surface 53 of the flange 52 of the second coupling component 22. As such, the first coupling component 21 can freely rotate with respect to the second coupling component 22 until the bore 56 aligns with an adjacent one of the apertures 70 and the ball 74 is biased into the bore 56 and the rivet 58 extends to the second position.

The extension 60 of the second coupling component 22 includes a first inner surface section 76, a second inner surface section 78, and a third inner surface section 80, each having a varying diameter. The diameter $D_4$ of the first inner surface section 76 is greater than the diameter $D_s$ of the second inner surface section 78 and the diameter of the second inner surface section 78 is greater than the diameter $D_6$ of the third inner surface section 80. The inner surface sections 76, 78, 80 cooperate to form a first stop 82 and a second stop 84. The first inner surface section 76 is configured to receive an intermediate first portion 86 of the extension 50 of the first coupling component 21 and the second inner surface section 78 is configured to receive a distal second portion 88 of the extension 50 of the first portion 21. The first stop 82 is configured to align and engage the intermediate first portion 86 when the first coupling component 21 is received in the second coupling component 22 to militate against movement of the intermediate first portion 86 in the axial direction beyond the first inner surface section 76. The second inner surface section 78 is configured to receive the distal second portion 88 of the extension 50 of the first coupling component 21. The second stop 84 engages the distal end of the extension 50 of the first coupling component 21 to militate against movement of the extension 50 in the axial direction beyond the second inner surface section 78.

An outer surface of the flange 62 of the second coupling component 22 includes an internally threaded bore 90 formed therein. The bore 90 is configured to receive a set screw 92. Corresponding and oppositely curved recesses 94 are circumferentially formed in the first inner surface section 76 of the second coupling component 22 and the outer surface of the first coupling component 21 to receive ball bearings 96 between the first coupling component 21 and the second coupling component 22 to facilitate rotation therebetween. The set screw 92 is externally threaded and configured to be received in the bore 90 and engage the ball bearings 94 to assert a compressional force upon the ball bearings 96 and consequentially upon the first coupling component 21. As a result, the set screw 92 facilitates anti-rotation between the first coupling component 21 and the second coupling component 22. A seal 98 is disposed between the first coupling component 21 and the second coupling component 22 at the first stop 82 to militate against leakage.

To assemble the hose rotator 20, the first coupling component 21 is received in the second coupling component 22. The first coupling component 21 is rotated until the bore 56 and the rivet 58 align with one of the plurality of apertures 70. Once the bore 56 and the one of the plurality of apertures 70 is aligned, the biasing member 72, which biases towards the top surface of the flange 52 of the first portion 21, forces the ball bearing 74 into the bore 56 to prevent rotation of the first coupling component 21 with respect to the second coupling component 22. The set screw 92 is threaded into the bore 90 and also facilitates in militating against rotational movement between the first coupling component 21 and the second coupling component 22.

In application, the annular extension 50 of the first coupling component 21 is coupled to the hose and the annular extension 60 of the second coupling component 22 is coupled to the fluid outlet 7*a* of the hose reel 100. In order to selectively rotate the hose with respect to the fluid outlet 7*a* of the hose reel 100, the set screw 92 must be decoupled from the set screw bore 90. The rivet 58, ball bearing 74, and biasing member 72 cooperate with each other to form a releasing mechanism so the first coupling component 21 can be rotated with respect to the second coupling component 22. A force, by a user with a finger or tool, for example, is applied to the stem 58*a* in the first position to overcome the biasing force of the biasing member 72. When the force by the user is applied, the rivet 58 urges the ball bearing 74 downwardly into the respective aligning one of the apertures 70, to the second position, to disengage the ball bearing 74 from preventing rotational movement between the first coupling component 21 and the second coupling component 22. The hose rotator is now in the freely rotatable position. The first coupling component 21 can be rotated clockwise or counter-clockwise with respect to the second portion at about 45 degrees, or at any interval as desired, until one of the other apertures 70 aligns with the bore 56. Upon the alignment, the biasing member 72 of the adjacent aperture 70 urges the ball bearing 74 into the bore 56 of the first coupling component 21 and causes the rivet 58 to extend outwardly from the flange 52 of the first coupling component 21 so the first coupling component 21 can be rotated again, if desired. Once rotated as desired, the set screw 92 can be received in the set screw bore 90 and engage the ball bearings 96 again.

As a result of the invention of the present disclosure, a hose can be rotated to minimize wear. The hose rotator 20 of the present disclosure permits the second coupling component 22 to remain in one position, without rotational movement, with respect to the fluid outlet of the hose reel 100, while allowing the first coupling component 21 to be rotatable with the hose selectively or periodically, while maintaining consistent fluid communication between the fluid outlet 7*a* and the hose. For example, as a maintenance task, the first coupling component 21 together with the hose can be rotated 45 degrees every three months to minimize wear and prolong the life of the hose. Although, the hose can be rotated at any time intervals as desired. The hose rotator 20 of the present disclosure is cost effective, simple, and can be fitted and modified to existing hose reels.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A hose rotator comprising:

a first coupling component;

a second coupling component, wherein the first coupling component is selectively rotatably received in the second coupling component; and a release system selectively disengaging a stationary rotational position of the first coupling component with respect to the second coupling component, wherein the first coupling component includes a flange and an annular extension and the second coupling component includes a flange and an annular extension, wherein the annular extension of the first coupling component is axially aligned with and received in the second coupling component, wherein a threaded bore is formed through the flanged of the second coupling component to receive a set screw.

2. The hose rotator of claim 1, wherein the annular extension of the first coupling component includes an inner threaded portion and the annular extension of the second coupling component includes an outer threaded portion.

3. The hose rotator of claim 1, wherein the flange of the first coupling component includes a single bore formed therethrough for receiving a portion of the release system.

4. The hose rotator of claim 3, wherein the flange of the second coupling component includes a plurality of apertures radially disposed a radial distance from an axial center of the hose rotator substantially equal to a radial distance from the axial center of hose rotator of the single bore of the flange of the first coupling component.

5. The hose rotator of claim 4, wherein the plurality of apertures are radially disposed from each other at an angle in a range of about 30 degrees of 180 degrees.

6. The hose rotator of claim 5, where in the angle is 90 degrees.

7. The hose rotator of claim 1, wherein a plurality of ball bearings are received between the first coupling component and the second coupling component.

8. The hose rotator of claim 7, wherein the set screw selectively exerts a compressional force upon the plurality of ball bearings to prevent rotation of the first coupling component with the second coupling component.

9. The hose rotator of claim 1, wherein a seal is disposed between the first coupling component and the second coupling component.

10. A hose rotator comprising:

a first coupling component;

a second coupling component, wherein the first coupling component is selectively rotatably received in the second coupling component; and a release system selectively disengaging a stationary rotational position of the first coupling component with respect to the second coupling component, wherein the first coupling component includes a flange and an annular extension and the second coupling component includes a flange and an annular extension, wherein the annular extension of the first coupling component is axially aligned with and received in the second coupling component, wherein the flange of the first coupling component includes a single bore formed therethrough for receiving a portion of the release system, wherein the flange of the second coupling component includes a plurality of apertures radially disposed a radial distance from an axial center of the hose rotator substantially equal to a radial distance from the axial center of hose rotator of the single bore of the flange of the first coupling component, wherein the release system includes a rivet, a biasing member, and a ball.

11. The hose rotator of claim 10, wherein the rivet is received in the single bore of the flange of the first coupling component, the biasing member and the ball are receiving in each of the plurality of apertures of the flange of the second coupling component.

12. The hose rotator of claim 10, wherein the release system locks the first coupling component in the stationary rotational position when an aligning one of the plurality of apertures of the flange of the second coupling component aligns with the single bore of the flange of the first coupling component, wherein the ball of the aligning one of the plurality of apertures extends into the single bore of the flange of the second component.

13. A hose rotator coupling a hose to a fluid outlet comprising:

a first coupling component configured to receive an end of a hose, the first coupling component having an annular extension;

a second coupling component receiving the annular extension of the first coupling component, the second coupling component configured to be received in a fluid outlet, wherein the first coupling component is rotationally stationary with respect to the second coupling component in each of a plurality of locked positions and rotationally movable with respect to the second coupling component in a freely rotatable position intermediate adjacent ones of the plurality of locked positions; and a release system having a button cooperating with the first coupling component and the second coupling component to permit the second coupling component to rotate to the freely rotatable position, wherein the release system includes a rivet, a plurality of biasing members, and a plurality of balls, wherein each of the plurality of biasing members and the rivet cooperate to translate a respective one of the plurality of balls in an axial direction of the hose rotator.

14. The hose rotator of claim 13, wherein the first coupling component includes a flange and a bore formed through the flange of the first coupling component and the second coupling component includes a flange and a plurality of apertures formed through the flange of the second coupling component, each of the plurality of apertures configured to align with the bore in the locked position.

15. The hose rotator of claim 14, wherein each of the plurality of apertures includes one of the plurality of biasing members and one of the plurality of balls and the bore includes the rivet.

16. The hose rotator of claim 14, wherein a threaded bore configured to receive a set screw is formed in the flange of the second coupling component.

* * * * *